United States Patent [19]

Fujigaki et al.

[11] Patent Number: 4,929,169
[45] Date of Patent: May 29, 1990

[54] WORKING EQUIPMENT FOR ROUGHENING THE SIDE OF OPTICAL FIBER

[75] Inventors: Takashi Fujigaki, Kanagawa; Yoshikazu Fujinaga, Aichi; Shuichiro Tokuda, Aichi; Noriyuki Furukawa, Aichi; Kiyoshi Ichimura, Tokyo; Yukio Shibuya, Tokyo; Shigeru Iuchi, Tokyo, all of Japan

[73] Assignee: Mitsubishi Rayon Co., Japan

[21] Appl. No.: 206,065

[22] Filed: Jun. 13, 1988

[30] Foreign Application Priority Data

Jun. 19, 1987 [JP] Japan .............................. 62-93351[U]

[51] Int. Cl.$^5$ ............................................... B24B 7/20
[52] U.S. Cl. ........................................ 425/385; 51/150; 51/283 R; 51/396; 264/1.5; 264/2.7; 264/162; 425/394
[58] Field of Search ................. 264/1.1, 1.5, 1.7, 2.7, 264/162, 293, 294; 425/385, 394, 396; 100/295; 350/96.1, 96.15, 96.22; 65/1, 61, 292; 51/131.4, 141, 150, 283 R, 388, 395, 396

[56] References Cited

U.S. PATENT DOCUMENTS

| | | | |
|---|---|---|---|
| 2,558,778 | 7/1951 | Pearse | 51/141 |
| 3,428,727 | 2/1969 | Higgins | 264/293 |
| 3,594,963 | 7/1971 | Beaseley | 51/395 |
| 3,715,820 | 2/1973 | Hentschel | 38/17 |
| 3,818,085 | 6/1974 | Marsland, Jr. et al. | 264/293 |
| 4,176,501 | 12/1979 | Bardonnet et al. | 51/277 |
| 4,231,730 | 11/1980 | Birt | 425/385 |
| 4,291,502 | 9/1981 | Grimsley et al. | 51/120 |
| 4,393,766 | 7/1983 | Thies | 100/99 |
| 4,423,674 | 1/1984 | Thies | 100/99 |
| 4,498,260 | 2/1985 | Doty | 51/217 R |
| 4,630,535 | 12/1986 | Haygreen | 100/127 |

FOREIGN PATENT DOCUMENTS

5933403   2/1980  Japan .
55-67704  5/1980  Japan .
55-130503 9/1980  Japan .

*Primary Examiner*—Jay H. Woo
*Assistant Examiner*—K. P. Nguyen

[57] ABSTRACT

The invention provides a working equipment for roughening the side of optical fiber having a hot stamper, a sheet having rough surface to be transferred, a cushion, and a cushion-mounted plate having a portion formed in stepwise or continuously curved or sloped form.

3 Claims, 2 Drawing Sheets

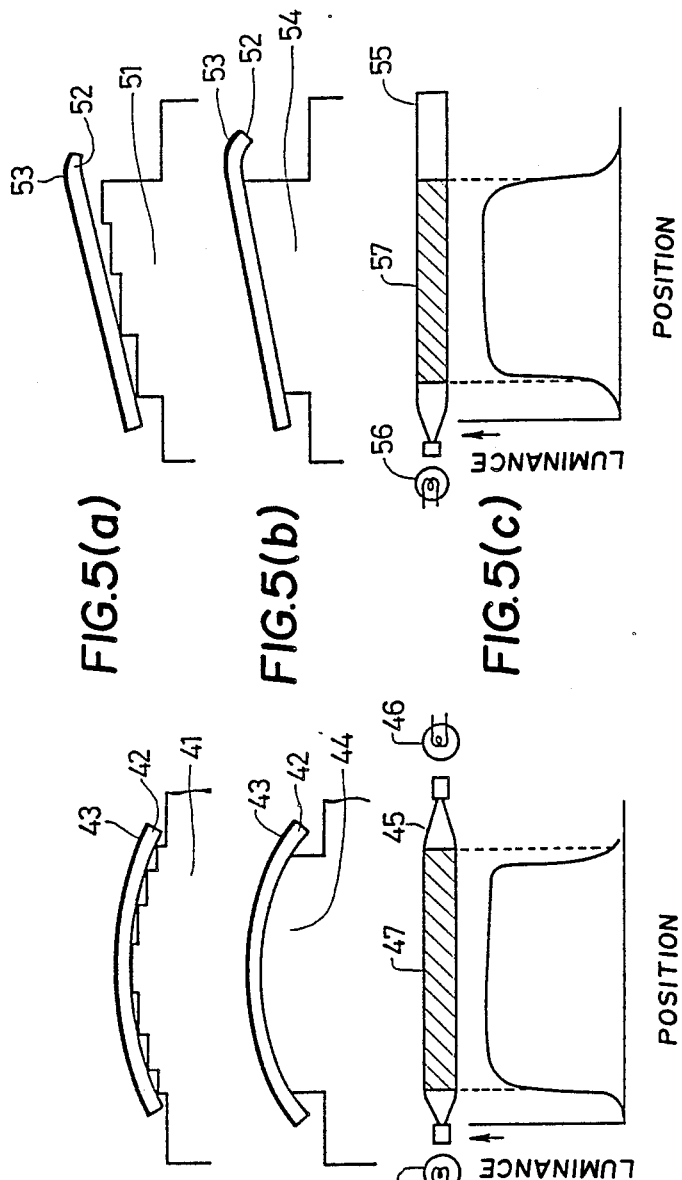

WORKING EQUIPMENT FOR ROUGHENING THE SIDE OF OPTICAL FIBER

BACKGROUND OF THE INVENTION

1. Field of the Invention

This invention relates to a working apparatus for roughening the side of an optical fiber, particularly an optical fiber ribbon consisting of optical fibers arranged in the form of tape, to allow light to leak uniformly through the side.

2. Description of the Prior Art

Most of the prior art apparatus are provided, for illumination of the function display part in dark, with a illumination unit which consists of an acrylic resin light guide, a lamp, and a light emitter such as LED.

The illumination unit of this type however has a structural disadvantage that the lamp is necessary to be disposed on the back of the display, and this presents difficulties such as rise in display temperature and uneven illumination.

For this reason, illumination units free of the above-mentioned defects have been developed. For example, illumination methods based on the construction that optical fiber ribbon have a section allowing light to leak on the side and this portion is disposed on the back of the display is disclosed in Japanese Laid-open Utility Models Nos. 9205/1987 and 9206/1987.

According to these methods, as shown in FIG. 3, an optical fiber ribbon 36 is interposed between a cushion 35, as on a plate, and an emery paper 33, and the latter is pressed against the side of the optical fiber ribbon by means of a hot stamper 31 with heating elements 32, so that the affected section (referred to as light-leakage section hereinafter) of the side becomes roughened to allow light to leak.

The thus-worked optical fiber ribbon has light leakage characteristics, particularly of the light leakage section, as represented by graph in FIGS. 2a and 2b, when a lamp is attached to either and each ends, respectively, of the optical fiber ribbon.

In these cases difficulty is encountered: FIG. 2a is the graph plotting the measured results of luminance passing through the light-leakage section 21 of the worked optical fiber ribbon 22 with a light source at one end and indicating a tendency of the luminance to fall with distance from the light source. On the other hand, the optical fiber ribbon similarly worked but with a light source at each end results in the graph (FIG. 2b) indicating the luminance to be high in the vicinity of each end of the ribbon and low in the neighborhood of the center. In FIG. 2b are designated optical fiber ribbon 4, light source 7, and light leakage section 8.

OBJECT AND SUMMARY OF THE INVENTION

Under the circumstances, an object of the invention is to develop a working equipment for making an optical fiber ribbon have an improved side light-leakage characteristic. In view of this, the invention has been accomplished. The equipment according to the invention is characterized by comprising a hot stamper with heating elements, a sheet having a rough surface to be transferred, a cushion, and a plate having a portion for mounting the cushion thereon, the portion being formed in stepwise or continuously curved or sloped form.

BRIEF DESCRIPTION OF THE DRAWINGS

FIGS. 4a, 4b, 5a and 5b are side views of cushion-mounted plates formed in various form to be useful as parts of the working equipment of FIG. 1.

FIGS. 4c and 5c are plane views of the optical fiber ribbons obtained by means of FIGS. 4a, 4b; and 5a, 5b, respectively, in combination with graphs plotting the corresponding side luminance characteristics of the light-leakage sections.

DETAILED DESCRIPTION OF THE INVENTION

Figure 2A:
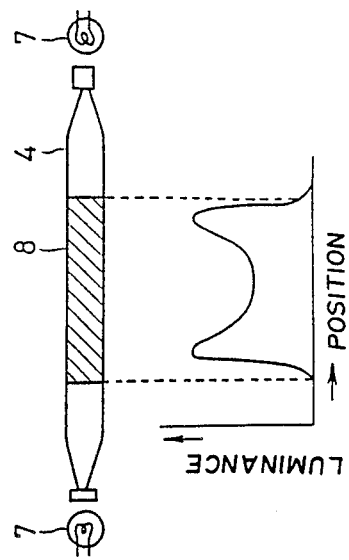
FIGS. 2a and 2b are plane views of optical fiber ribbons obtained in a prior art, in combination with graphs plotting the corresponding side luminance characteristics of the sections affected by the working equipment of FIG. 3.
Figure 2B:
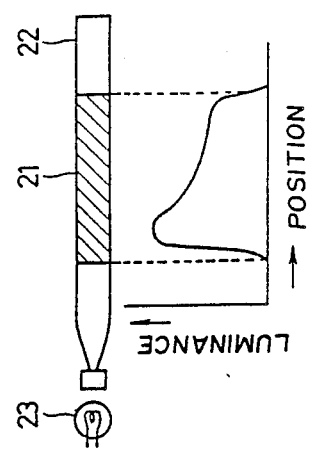
Figure 1:
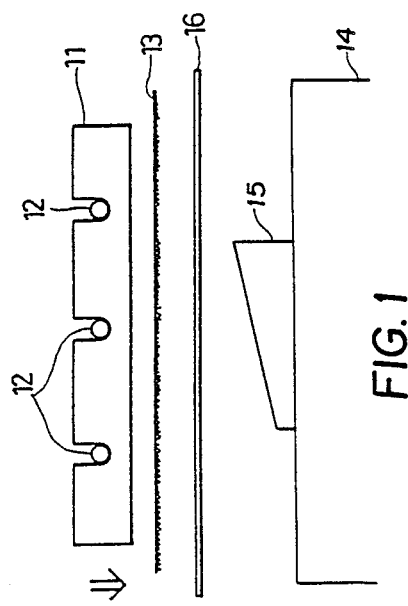
FIG. 1 is a side view of a working equipment according to the invention shown schematically.
Figure 3:
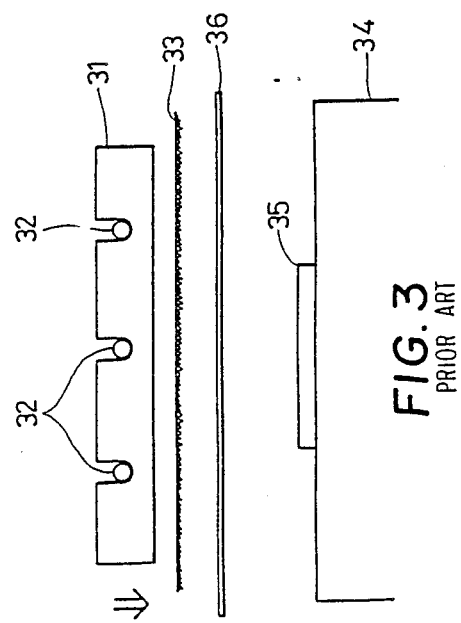
FIG. 3 is a side view of a prior art equipment illustrated schematically.

The invention will be described more fully by way of examples with reference to the accompanying drawings hereinafter:

The apparatus embodying the invention is composed of a hot stamper 11 with heating elements 12, an emery paper 13 having a rough surface to be transferred, a cushion 15 and a cushion-mounted plate 14, as shown in FIG. 1.

With the apparatus for roughing the side of an optical fiber ribbon according to the invention, an optical fiber ribbon 16 made of plastic is inserted between cushion 15 and emery paper 13 as shown in FIG. 1, and then pressed together by a hot stamper 11.

In this case it is necessary for the portions 41, 44, 51, 54 of the cushion-mounted plate to be formed stepwise, continuously curved sloped form, as shown in FIGS. 4a, 4b, 5a and 5b, respectively.

FIGS. 4a shows a cushion-mounted plate have a stepped curved portion 41. When an optical fiber ribbon is worked, a cushion 42 is mounted on the stepped portion 41, and a releasing sheet 43, as desired, is superimposed as shown. FIG. 4b is the same as FIG. 4a except the cushion-mounted plate has a continuously curved portion. Referring to FIG. 4c, optical fiber ribbon 45 resulting from the plates illustrated in FIGS. 4a and 4b exhibits the characteristic of luminance versus light-leakage position in the light-leakage section 47, as given by the graph, when a light source 46 is provided at each end. This demonstrates that the optical fiber ribbon worked with the optical fiber working equipment according to the invention allows very uniform light leakage through the light-leakage section.

FIG. 5a shows a cushion-mounted plate have a stepwisesloped portion 51 on which a cushion 52 is mounted, and a releasing sheet 53 overlaid on the cushion 52, as shown. FIG. 5b is the same as FIG. 5a except the cushion-mounted plate has a continuously sloped portion 54. Referring to FIG. 5c, using each shown cushion-mounted plate of FIGS. 5a and 5b, for working the side the optical fiber ribbon 55 is obtained which exhibits the characteristic of luminance against light-leakage position in the light-leakage section 57, as given by the graph, when a light source 56 is provided at an end. This demonstrates that the optical fiber ribbon worked with the optical fiber working equipment according to the invention allows very uniform light leakage through the light-leakage section.

As above-described in detail, the working equipment for roughening the side of an optical fiber ribbon according to the invention can work the light leakage section so that luminance may be uniform over the section compared with that by the prior art equipment, this contributing to manufacturing more beneficial illuminators, etc.

What is claimed is:

1. A working equipment for roughening a side of optical fiber ribbon, comprising: a hot stamper, a sheet having a rough surface to be transferred disposed below said stamper, a cushion disposed below said sheet and a cushion-mounting plate disposed said cushion disposed below said sheet, said cushion mounting plate having a mounting surface portion on which said cushion is mounted, said mounting surface portion having a profile selected from the group consisting of a stepped shape, a continuously curved form, and an inclined form, wherein said ribbon is to be disposed between said sheet and said cushion.

2. A working equipment claimed in claim 1 wherein said sheet having a rough surface to be transferred is an emery paper.

3. A working equipment claimed in claim 1 or 2 wherein a releasing sheet is overlaid on said cushion.

* * * * *